Patented Nov. 5, 1940

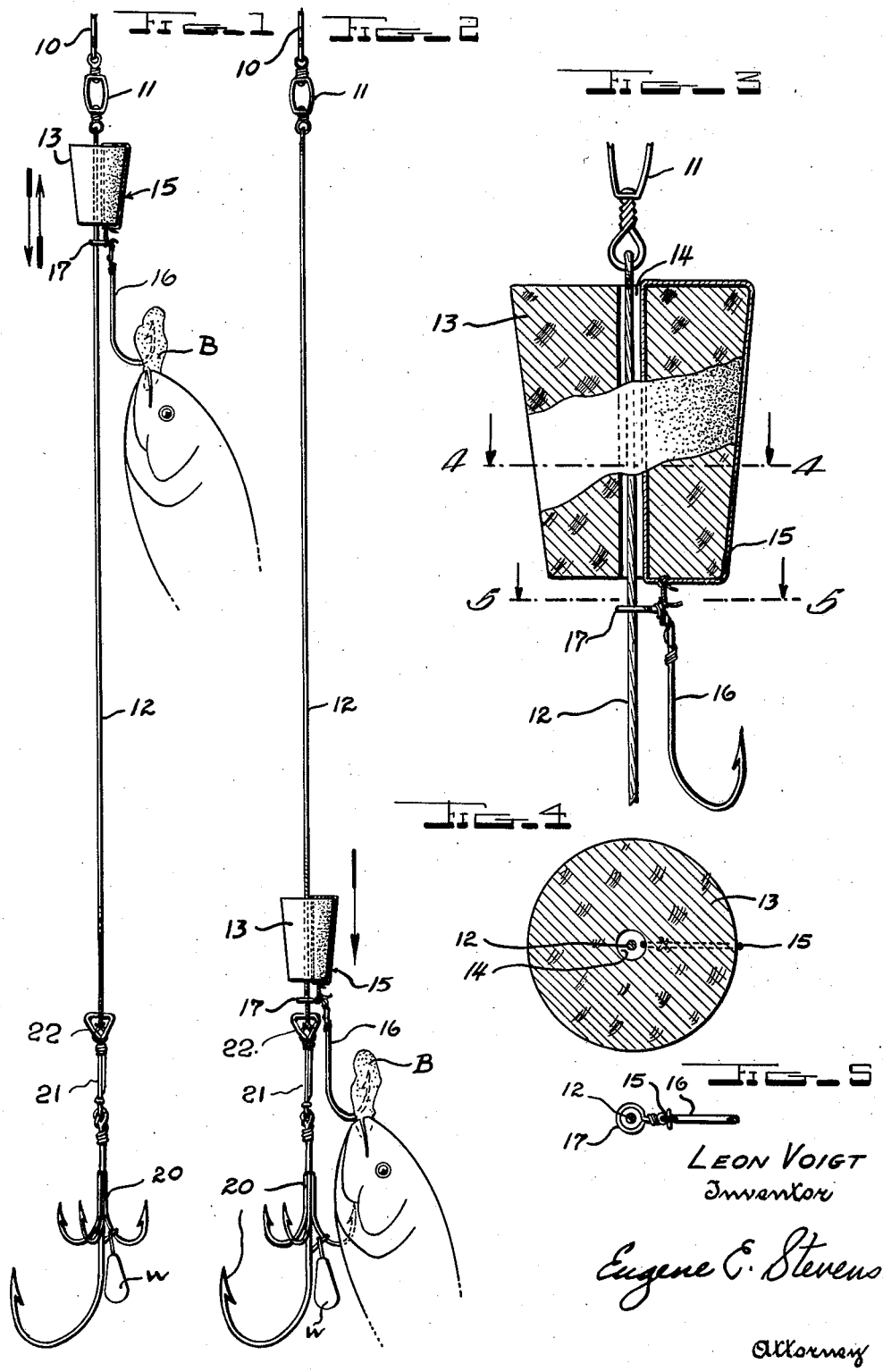

2,220,559

UNITED STATES PATENT OFFICE 2,220,559

TRAP HOOK

Leon Voigt, Galveston, Tex.

Application October 10, 1939, Serial No. 298,831

8 Claims. (Cl. 43—34)

My invention relates to fish hooks for catching crabs, lobsters and the like, as well as all kinds of fish, and more particularly to trap hooks wherein a bait carrying hook and a snag hook are movable relative to each other whereby the fish is caught or snagged by the latter.

An object of my invention is to provide an improved self setting fish hook of the type designated.

A further object is to provide such a hook wherein the setting thereof is accomplished automatically by the buoyancy of one of the members thereof.

A further object is to provide a novel combination of relatively movable and stationary hooks.

A further object is to provide a self setting trap hook wherein a buoyant hook carrying member is freely slidable on the leader of a snag hook.

Other objects and advantages reside in the particular structure of my device, combination and arrangement of the several parts and in the particular mode of operation,—all of which will be readily apparent to those skilled in the art upon reference to the drawing in connection with the detailed description to follow.

In the drawing:

Figure 1 is an elevation showing my device in its set position;

Figure 2 is a similar view showing the device in its sprung position;

Figure 3 is an enlarged fragmentary elevation, with parts in vertical section, of the self setting bait hook;

Figure 4 is a horizontal section taken on a plane corresponding substantially to that indicated by the line 4—4 of Figure 3; and Figure 5 is a horizontal section taken on the line 5—5 of Figure 3.

In the drawing, wherein like reference characters have been used throughout to designate like parts, 10 designates the lower end of a fishing line to which is attached, in any suitable manner, one end of a swivel 11. A leader 12 is suitably attached to the other end of swivel 11. The lower end of leader 12 is suitably attached to the upper end 22 of a stop member 21 which comprises a rigid extension of the shank or shanks of one or more snag hooks 20. A weight or sinker W may be carried by the hooks 20.

The stop 21 may be formed of Monel metal, stainless steel or the like to prevent corrosion.

A conventional cork or float 13 is axially bored as at 14 and is thereby threaded on the leader 12 to be freely slidable thereon. Any suitable means 15 connects a bait hook 16 to the float 13 with the bent over eye 17 of the hook 16 in axial alignment with the bore 14 of the float. In the form of connection shown, the connection 15 comprises a flexible member passed through the bore 14 and having its ends secured together outwardly of the cork so as to leave a free end 15ª which, in turn, is tied to the shank of the bait hook 16. One of the ends of the flexible member 15 is then suitably atached to the hook 16 to permit universal swinging movement of the latter relative to the cork.

The operation of the device is illustrated in Figures 1 and 2. Bait B is placed upon the bait hook 16 as usual and when a fish nibbles the bait it moves the eye 17 of the hook 16 to engage leader 12 and transmit the nibble to the angler, whereupon the angler gives line 10 a jerk which raises the snag hooks 20 to the Figure 2 position to catch the fish. On the other hand, if, instead of merely nibbling, the fish seizes the bait and runs with it, the reverse occurs and the fish is snagged when the hook 16 has been pulled down the leader to the Figure 2 position. In the event that the fish nibbles and flees before he can be caught, the buoyancy of the float 13 automatically resets the bait hook 16 in its proper position. At the same time, the arrangement makes it possible to use a relatively heavy weight W on the lower end of the device to keep the line in position in swift currents.

The upper end 22 of the extension 21 is formed to provide a stop for stopping the relative movement of the bait and snag hooks. By this arrangement tangling of the bait and snag hook is prevented although the two hooks are permitted to approach closely enough to snag a fish.

While I have shown and described what is now thought to be the preferred embodiment of my invention, it is obvious that the same is susceptible of other forms and embodiments. While the drawing shows the device used to catch a fish, it is obvious that it can be used also to catch crabs, lobsters and the like as well. Consequently, I do not limit myself to the precise disclosure of this specification except as hereinafter claimed.

I claim:

1. In a fish hook of the class described, including at least one bait hook and at least one snag hook movable relative to each other, a leader for said snag hook, a symmetrical buoyant member carried by said bait hook, said member having an axial bore formed therethrough, said leader extending through said bore to render said member freely slidable on said leader.

2. In a fish hook of the class described, including at least one bait hook and at least one snag hook movable relative to each other, a leader for said hook, an axially bored cork freely slidable on said leader, and means connecting said cork to said bait hook.

3. In a fish hook of the class described, including at least one bait hook and at least one snag hook movable relative to each other, a leader for said snag hook, an axially bored cork freely slidable on said leader, and means connecting said cork to said bait hook, said connecting means permitting universal swinging movement of said bait hook relative to said cork.

4. In a fish hook of the class described, including at least one bait hook and at least one snag hook movable relative to each other; a buoyant member carried by said bait hook, and a stop interposed between said bait hook and snag hook to limit the relative movement of said hooks and prevent the tangling thereof.

5. The structure of claim 4, and said stop comprising an integral extension of said snag hook.

6. In a fish hook, the combination of a snag hook having a leader, a buoyant bait hook carrying member freely slidable on said leader above said snag hook, and a stop on said leader interposed between said bait hook and snag hook to limit the relative movement of said hooks and prevent tangling thereof.

7. In a fish hook of the class described, including at least one bait hook and at least one snag hook movable relative to each other, a leader for said snag hook, an assembly comprising a buoyant member and said bait hook, said assembly being so freely slidable on said leader above said snag hook that a pull on said leader in an upward direction causes free movement of said leader and snag hook relative to said assembly.

8. In a fish hook, the combination of a snag hook having a leader, and a buoyant member mounting a bait hook, said buoyant member being so freely slidable on said leader that a pull on said leader in an upward direction causes said leader and snag hook to move freely towards and relative to said buoyant member and bait hook.

LEON VOIGT.